United States Patent [19]
Tanimoto et al.

[11] Patent Number: 5,156,046
[45] Date of Patent: * Oct. 20, 1992

[54] SWITCHING CONTROL TYPE THERMAL FLOW SENSOR

[75] Inventors: Koji Tanimoto; Mikio Bessho, both of Hyogo, Japan

[73] Assignee: Mitsubishi Denki Kabushiki Kaisha, Tokyo, Japan

[*] Notice: The portion of the term of this patent subsequent to Jun. 19, 2007 has been disclaimed.

[21] Appl. No.: 446,088

[22] Filed: Dec. 5, 1989

[30] Foreign Application Priority Data

Dec. 12, 1988 [JP] Japan ................. 62-314230
Dec. 12, 1988 [JP] Japan ................. 62-314231

[51] Int. Cl.⁵ .............................................. G01F 1/68
[52] U.S. Cl. ......................... 73/204.18; 73/204.14; 73/118.2
[58] Field of Search ........... 73/204.14, 204.15, 204.18, 73/118.2

[56] References Cited

U.S. PATENT DOCUMENTS 4,934,188 6/1990 Tanimoto et al. ............... 73/204.14

OTHER PUBLICATIONS

"An Integrated flow sensor with pulse-modulated output" by Stemme in Transducers 87 pp. 364–367.
Sauer "Hot Wire Air Mass Meter" SAE Technical Paper Series 800468 Feb. 1980.

Primary Examiner—Herbert Goldstein
Attorney, Agent, or Firm—Wolf, Greenfield & Sacks

[57] ABSTRACT

A thermal flow sensor of a switching control type for measuring the flow rate of intake air of an internal combustion engine comprises a bridge circuit including temperature sensing resistors, a differential amplification circuit, a pulse generating circuit, a power supply control circuit and a resonance preventing circuit. The amplification circuit amplifying the output from the bridge circuit. The pulse generating circuit receives the output from the amplification circuit and generates a pulse train which has a time ratio corresponding to the output level of the amplification circuit. The power supply control means comprises a switching transistor which is turned on and off by the pulse train from the pulse generating circuit and a smoothing circuit which makes the output from the transistor continuous and supplies the continuous voltage to the bridge circuit. The resonance preventing circuit comprises a phase lag compensation circuit including a resistor and a capacitor connected in series between a differential amplifier of the amplification circuit, or a variable DC unbalanced voltage generator including a V/I converter which converts the voltage received from the bridge circuit to a current corresponding to the level of the received voltage and a resistor which converts the current output from the V/I converter to a voltage and outputs a variable DC unbalanced voltage thereacross, whereby the resonance phenomenon in the full range of the flow rate is prevented.

7 Claims, 8 Drawing Sheets

SWITCHING CONTROL TYPE THERMAL FLOW SENSOR

BACKGROUND OF THE INVENTION

1. Field of the Invention

The present invention relates to a switching control type thermal flow sensor, and more particularly relates to a switching control type thermal flow sensor adapted to measure the flow rate of intake air for an internal combustion engine or the like.

2. Prior Art

A thermal flow sensor applies a heat transfer phenomena from the exothermic element comprising a temperature sensing resistance disposed in the intake air to the intake air and generally utilizes a constant temperature measuring method which is excellent in respect of response. According to the constant temperature measuring method, a bridge circuit and a differential amplifier are so constructed that the temperature of the exothermic element is always higher by a constant temperature than the temperature of the intake air. However, in the constant temperature measuring method, since the power loss of a transistor for supplying current to the bridge circuit is considerably high, an intermittent control method has been proposed wherein the transistor is intermittently turned on and the duty ratio thereof is controlled in order to reduce the power loss but to attain an equivalent flow temperature measurement result.

Examples of this intermittent control method are shown in FIGS. 1, 2 and 3.

In FIG. 1, an exothermic temperature sensing element (heating element) 2 and a temperature sensing element 3 for sensing the temperature of an intake air are provided in an air intake tube 1. These temperature sensing elements 2, 3 are comprised of, for example, five wires or membrane resistant elements of platinum, tungsten, nickel or the like the resistance value of which will vary depending on the temperature. These temperature sensing elements 2, 3 and stationary resistors 4–6 constitute a Wheatstone bridge. The connection point P between the fixed resistor 6 and the temperature sensing element 2, and the connection point Q between the fixed resistors 4 and 5 are coupled to differential input terminals of a differential amplification circuit so as to amplify the difference between the unbalanced voltage from the bridge circuit. The differential amplification circuit comprises fixed resistors 7–9 and a differential amplifier 10. An output voltage from the differential amplification circuit is converted by a pulse duration converting circuit 12 to a pulse train. The pulse duration converting circuit 12 comprises a comparator 121, an input terminal of which is connected to the output terminal of the differential amplification circuit, and a transistor 122, the base terminal of which receives the comparison output from the comparator 121. A triangular wave generator 11 connected to the other terminal of the comparator 121 will be a signal source for pulse duration conversion. The pulse train output from the circuit 12 has a time ratio corresponding to the output level from the differential amplification circuit and is supplied to a switching transistor 13 so that the transistor 13 is turned on and off in response to the time ratio of the pulse train. The power from a DC power source connected to a terminal 18 is intermittently supplied through the transistor 13 to a smoothing circuit comprising a diode 14, an inductor 15 and a capacitor 16 and then supplied to the bridge circuit as continuous power. The resistance values of the respective resistors are set so that the bridge circuit will be balanced when the temperature of the exothermic temperature sensing element 2 is higher by a specified temperature than the temperature of the intake air. A constant temperature circuit may be implemented by constituting a feed-back circuit as explained above.

Operation of the thermal flow sensor of the above-described constitution will next be explained. Supposing that the air flow in the air intake tube 1 has increased, then the temperature of the exothermic temperature sensing element 2 will be reduced and the resistance value thereof will thereby be larger. Accordingly, the potential at the connection point P between the exothermic temperature sensing element 2 and the fixed resistor 6 will be decreased, and the voltage output from the differential amplifier 10 will be increased. Furthermore, the time ratio of the pulse string from the pulse duration conversion circuit 12 will vary and the pulse width of each of pulses will be decreased. Namely, the low level duration of the pulse train will be increased. Accordingly, the time duration during which the transistor 13 is ON will be increased and the heating current to the bridge circuit which has been made continuous by the smoothing circuit will also be increased so that the temperature of the exothermic temperature sensing element 2 may be prevented from being lowered. As a consequence, the temperature of the exothermic temperature sensing element 2 may be kept constant.

At this time, the switching time ratio $D (=T_{ON}/T)$ of the switching transistor 13 is expressed by the following condition:

$$D = \frac{I(R_h + R_6)}{V_{in}} \quad (1)$$

where I is value of a heating current of the element 2; $V_{in}$ is an output voltage of the DC power source supplied to the terminal 18, $R_h$ is a resistance value of the element 2; and $R_6$ is a resistance value of the resistor 6.

On the other hand, the relationship between the heating current value I and the air flow rate Q, while the constant temperature control is being executed, is expressed by the following equation:

$$I = \sqrt{a + b\sqrt{Q}} \quad (2)$$

where a and b are constant values. Accordingly, the time ratio D will be represented as follows:

$$D = \frac{(R_h + R_6) \cdot \sqrt{a + b\sqrt{Q}}}{V_{in}} \quad (3)$$

Since resistances $R_h$ and $R_6$ are constant, the time ratio D depends on the air flow rate Q under the assumption that the source voltage $V_{in}$ will not be changed. Consequently the flow rate Q can be obtained by measuring the ON and OFF time durations of the switching transistor 13, namely by measuring the duty ratio of the pulse train from the converting circuit 12. Furthermore, since the output signal for measuring the duty ratio is obtained in digital form, no interface circuit with a microprocessor will be required, which is an inherent advantage.

FIG. 2 shows another conventional circuit of a switching control type thermal flow sensor. In FIG. 2, a DC unbalanced power source 17 is added to the prior art circuit shown in FIG. 1 and is connected between the connection point P and a terminal of the resistor 8.

The DC unbalanced power source 17 is incorporated in order to prevent the operation of the feed-back loop circuit from resonance phenomenon. Taking the DC unbalanced voltage $\Delta E$ provided by the source 17 into consideration, the resistance value $R_h$ of the temperature sensing element 2 will be obtained by the following equation:

$$R_h = (R_k + R_4)R_6/R_5 + \Delta R_h \qquad (4)$$

where $R_k$ is the resistance value of the temperature sensing element 3 for detecting a temperature of the intake air; $R_4$ and $R_5$ are the resistance values of the resistors 4 and 5; and $\Delta R_h$ is the resistance value increased at the element 2 by the incorporation of the power source 17.

The $\Delta R_h$ will be calculated by the following equation:

$$\Delta R_h = \{\Delta E - I(R_h + R_6)/A\}\{1 + (R_k + R_4)/R_5\}/I \qquad (5)$$

where $\Delta E$ is a voltage of the power source 17; and A is a DC unbalance gain of the amplification circuit. The DC gain A is equal to $R_9/R_8$, $A = R_9/R_8$, wherein $R_8$ and $R_9$ are the resistance value of the resistors 8 and 9.

As is apparent from equations (4) and (5), the resistance value $R_h$ of the temperature sensing element 2 is dependent on the heating current value I, and therefore is variable depending on the flow rate Q. In other words, the larger the flow rate is, the smaller is resistance $R_h$. And if the DC gain A is smaller, this resistance variation is larger. Therefore, in order to attain an ideal constant temperature circuit wherein the value $\Delta R_h = 0$, it is preferable for the DC gain A to be larger.

In FIG. 6, numeral 22 denotes a curve of frequency characteristic of the differential amplification circuit. This shows a flat frequency characteristic up to the resonance frequency of the smoothing circuit. Numeral 21 designates a curve of an open-loop frequency characteristic of the amplifier 10.

Numeral 24 in FIG. 7 shows a curve of a frequency characteristic of the output of the sensor relative to a fine variation of the flow rate when the average of the flow rate Q is constant. According to this characteristic curve 24, the peak of the gain is observed near the resonance frequency of the smoothing circuit. This is due to the influence of the resonance frequency of the smoothing circuit and because the DC gain A is too high in the resonance frequency range in which a phase lag exceeds 180 degree. The level of the peak on the curve 24 will be larger, the greater is the average of the flow rate Q and the greater is the DC gain A, resulting in an unstable characteristic of the circuit. This will inhibit the DC gain A from being set at a high level. Because of this problem, an ideal constant temperature circuit could not be complemented.

It is also noted that as the flow rate is increased, a resonance frequency response will be provided, whereby the measurable range of flow rate will be narrower and the maximum flow rate in the measurable range will be limited approximately to 50 g/sec. This maximum flow rate corresponds only to about one third of the maximum intake air volume for a natural air intake engine having a displacement of 2000 cc, and therefore it is impossible to cover the full range of flow rate.

FIG. 3 illustrates another prior art circuit of a thermal flow sensor of a switching control type, wherein a DC unbalanced power source comprises a constant current source 20 and a fixed resistor 19. Other constitutions than the above are the same as that shown in FIG. 2.

The operation of the prior art circuit described above is also the same as that of the prior art circuit shown in FIG. 2.

The DC unbalanced power source is necessary for adjusting the AC characteristic of the sensor.

FIGS. 8(a) and (b) illustrate the frequency characteristic of the sensor output relative to a fine variation of the flow rate when the gain A is constant and an average flow rate Q in a time duration is constant [or 2 g/sec in FIG. 8(a) and 100 g/sec in FIG. 8(b)], according to the above-mentioned prior art circuit shown in FIG. 3. As is apparent from the comparison between FIGS. 8(a) and (b), the greater the average flow rate Q is, the wider is the frequency band of the sensor output when the gain A is constant. As shown in FIG. 8(a), when the average flow rate is small, the peak will appear around the resonance frequency of the smoothing circuit and the larger the DC unbalanced voltage $\Delta E$ is, the large is such a peak. On the other hand, as can be seen from FIG. 8(b), when the average flow rate Q is large, the DC unbalance voltage $\Delta E$ is small, and the higher is the peak and therefore the more the resonance characteristic is caused. Accordingly, if $\Delta E$ is set to be small in order to avoid resonance in the range of a small flow rate, then resonance will result in the range of a large flow rate. As a consequence, the maximum flow rate in the measurable range will be limited to about 50 g/sec. This means that the full range of flow rate could not be covered by the prior art sensor shown in FIG. 3.

Namely in the prior art thermal flow sensor of switching control type, the greater the flow rate, the greater is the resonance frequency response which results, and since the relationship between the DC unbalanced voltage $\Delta E$ and the frequency characteristic is different in the case of a high flow rate and in the case of a low flow rate, the measurable range of flow rate is resultingly narrower.

Further, in the prior art thermal flow sensor of switching control type as shown in FIG. 1, 2 or 3, as it is clear from equation (3), if the source voltage $V_i$ supplied to the terminal 18 varies, the relationship between the time ratio D (or the duty ratio of the sensor output) and the flow rate Q also varies accordingly and therefore the variation of the voltage $V_i$ will directly appear as a flow rate error. For example, when the voltage $V_i$ varies by 1%, it will approximately cause a 4% flow rate error.

In general, since the voltage of a battery for use in an automobile varies between a range of 8–16 V, it is necessary to compensate the variation by measuring the source voltage. However, an analog-digital converter is required for obtaining a digital signal corresponding to the measured source voltage. Therefore, the above-mentioned advantage provided by the digital output signal from the sensor cannot be utilized.

SUMMARY OF THE INVENTION

It is an object of this invention to provide a thermal flow sensor of the switching control type which is capable of providing an optimum frequency response for a wide range of flow rates.

It is another object of this invention to provide a thermal flow sensor of the switching control type which is capable of accurately measuring a flow rate regardless of variation in the source voltage and of obtaining a digital output.

The first object is achieved by a thermal flow sensor of a switching control type including means for preventing resonance phenomenon in the full range of flow rate.

The second object is achieved by a thermal flow sensor of a switching control type including means for comparing outputs from a Wheatstone bridge and a triangular wave generator and outputting a digital output signal the time ratio of which corresponds to the flow rate of intake air.

DESCRIPTION OF THE PREFERRED EMBODIMENTS

Figure 1:
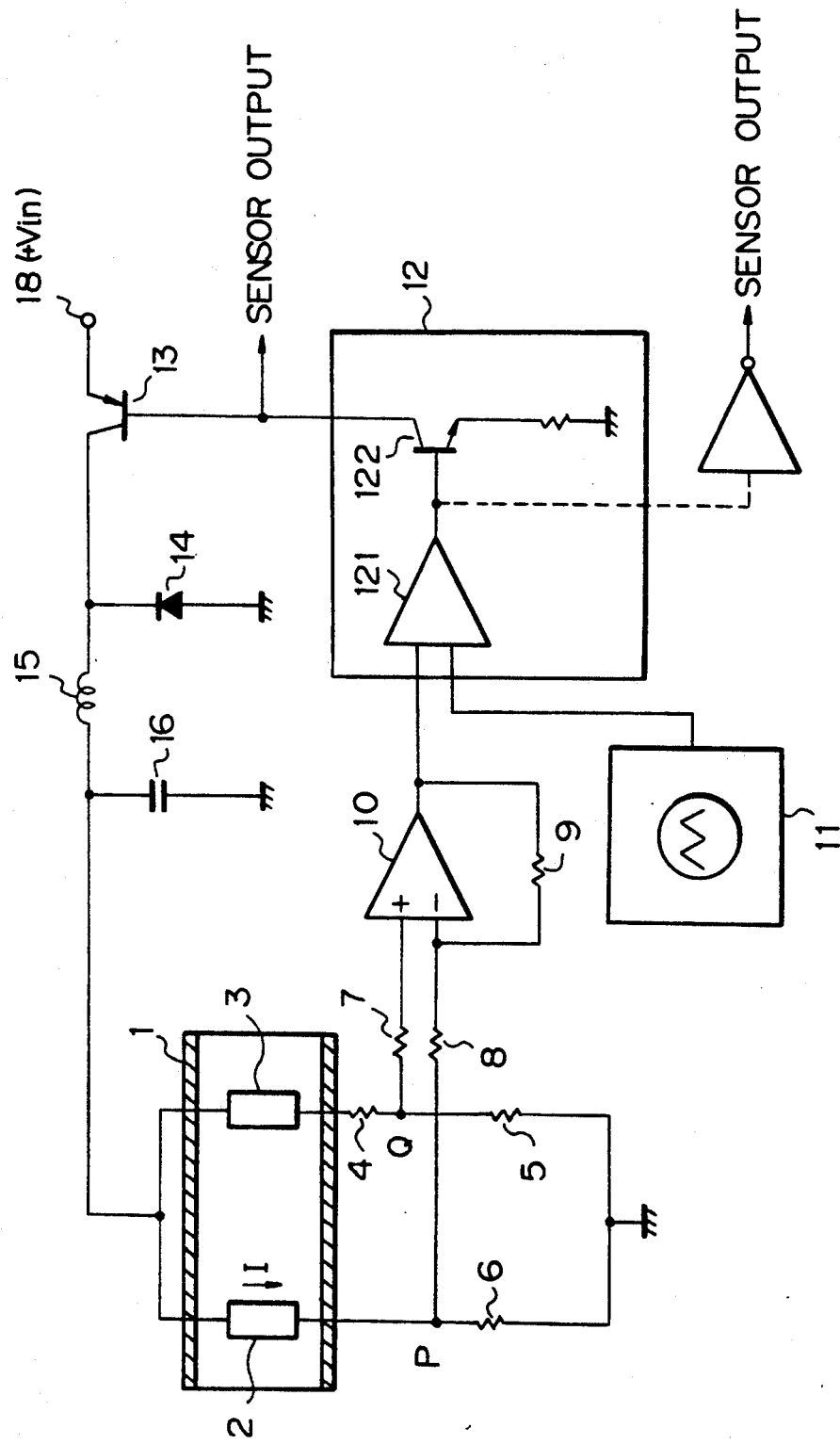
FIGS. 1, 2 and 3 are circuit diagrams of thermal flow sensors according to the prior art.
Figure 2:
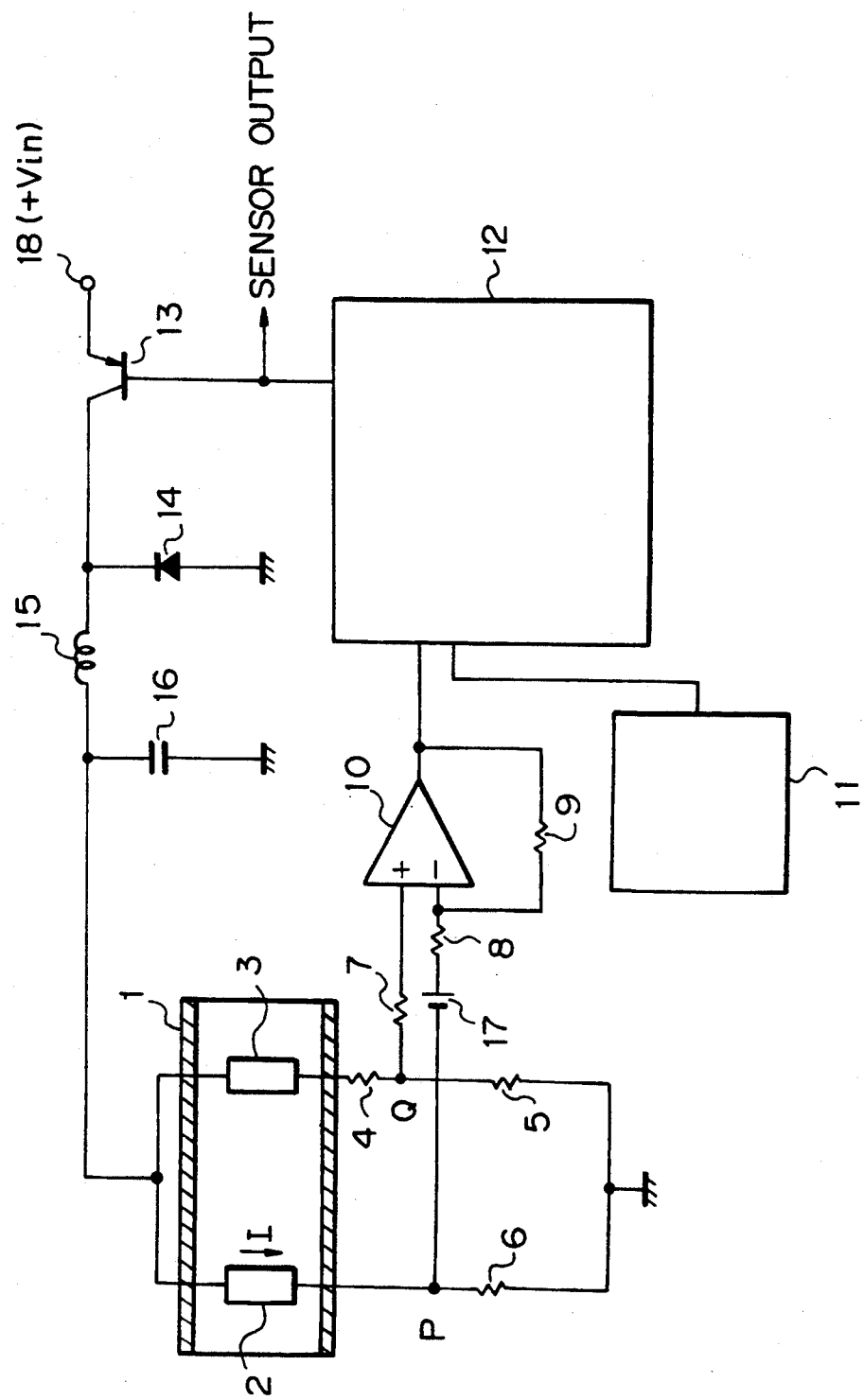
Figure 4:
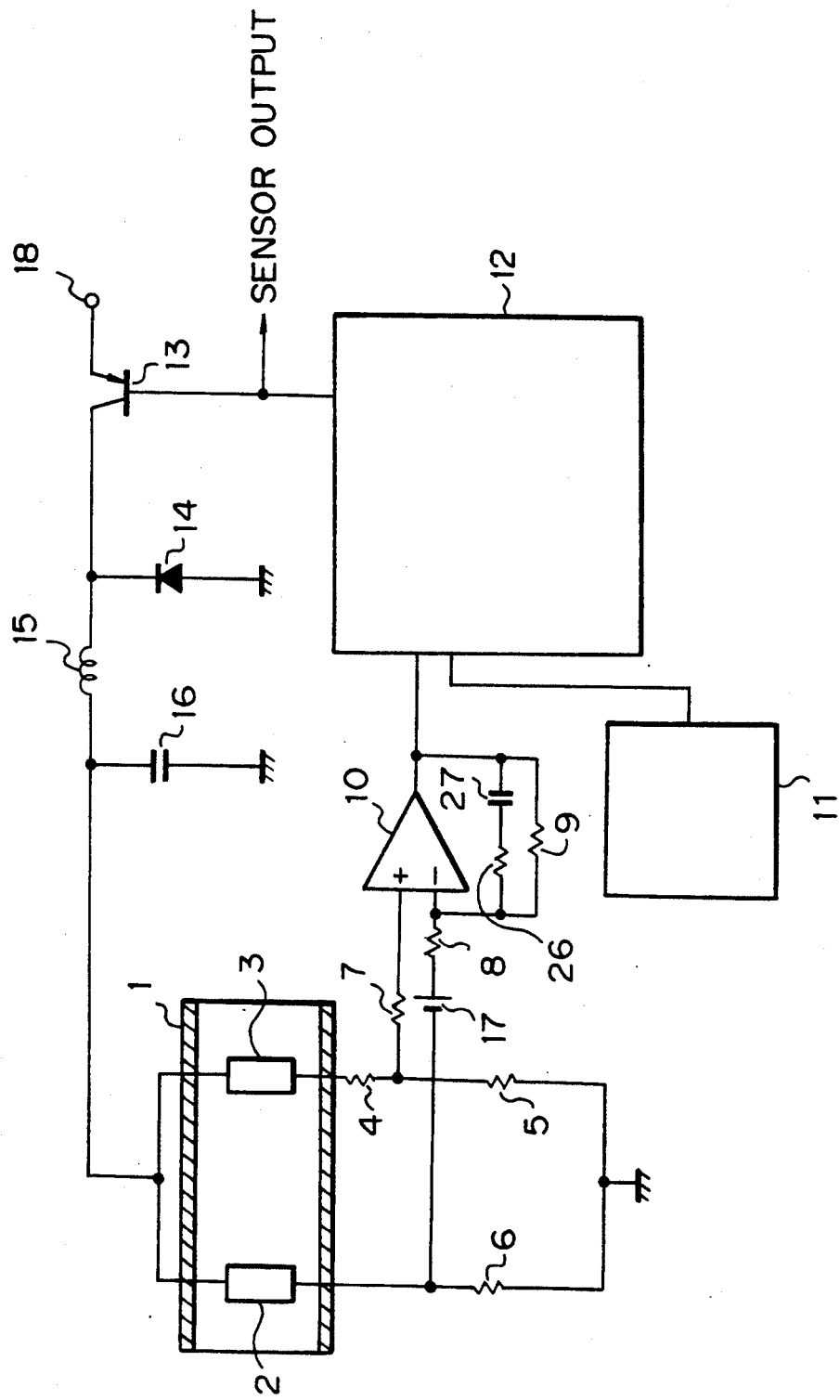
FIGS. 4 and 5 show circuit diagrams of first and second embodiments of this invention.

Embodiments of the present invention will now be explained with reference to the accompanying drawings. FIG. 4 illustrates a first embodiment of the present invention in which a series circuit of a resistor 26 and a capacitor 27 is connected in parallel to a feed back resistor 9. The resistance value of the resistor 26 is set to be smaller than that of the resistor 9. Other elements are similar to those shown in FIG. 2.

Figure 6:
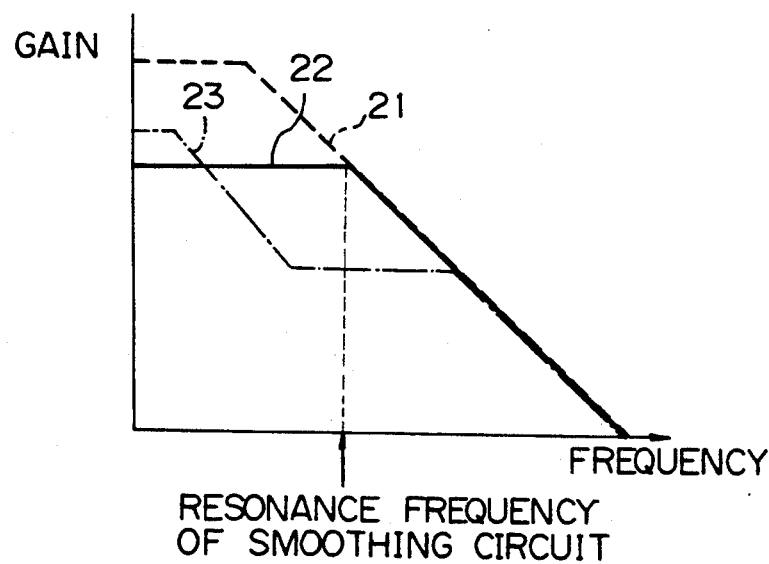
FIG. 6 is a frequency characteristics diagram of a differential amplification circuits of flow sensors as shown in FIGS. 2 and 4.
Figure 7:
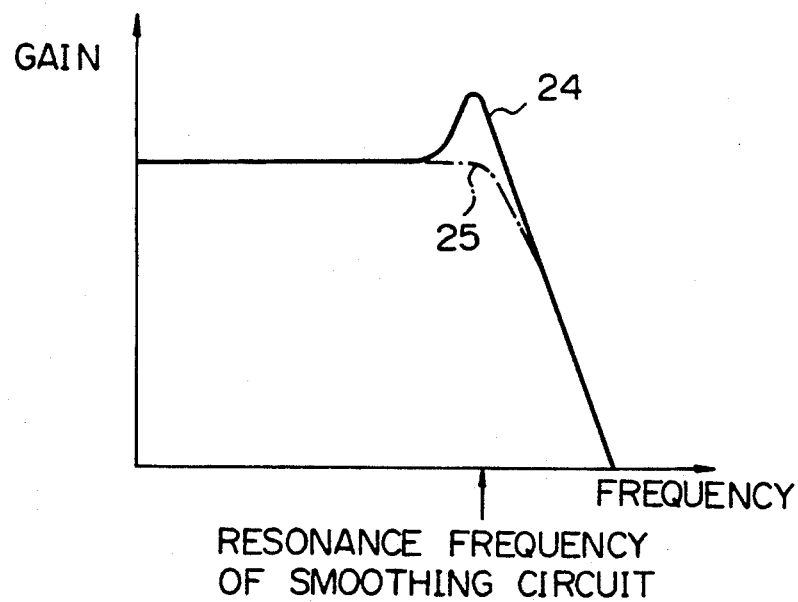
FIG. 7 is a diagram representing frequency resonance characteristics of flow sensors as shown in FIGS. 2 and 4.

In the embodiment shown in FIG. 4, a phase lag compensating circuit is comprised of the resistors 9, 26 and the capacitor 27. This will cause the frequency characteristic of the AC differential gain of the differential amplification circuit to be such that by properly selecting the values of the resistor 26 and the capacitor 27, the high frequency gain will provide a low frequency response characteristic with a high DC differential gain as in the prior art, as shown by a characteristic curve 23 in FIG. 6. Accordingly, the frequency response characteristic of the sensor for a fine variation in the flow rate will become as shown by the characteristic curve 25 in FIG. 7. Thus, a frequency characteristic having optimum attenuating characteristics may be obtained by lowering the AC gain of the differential amplification circuit.

Figure 3:
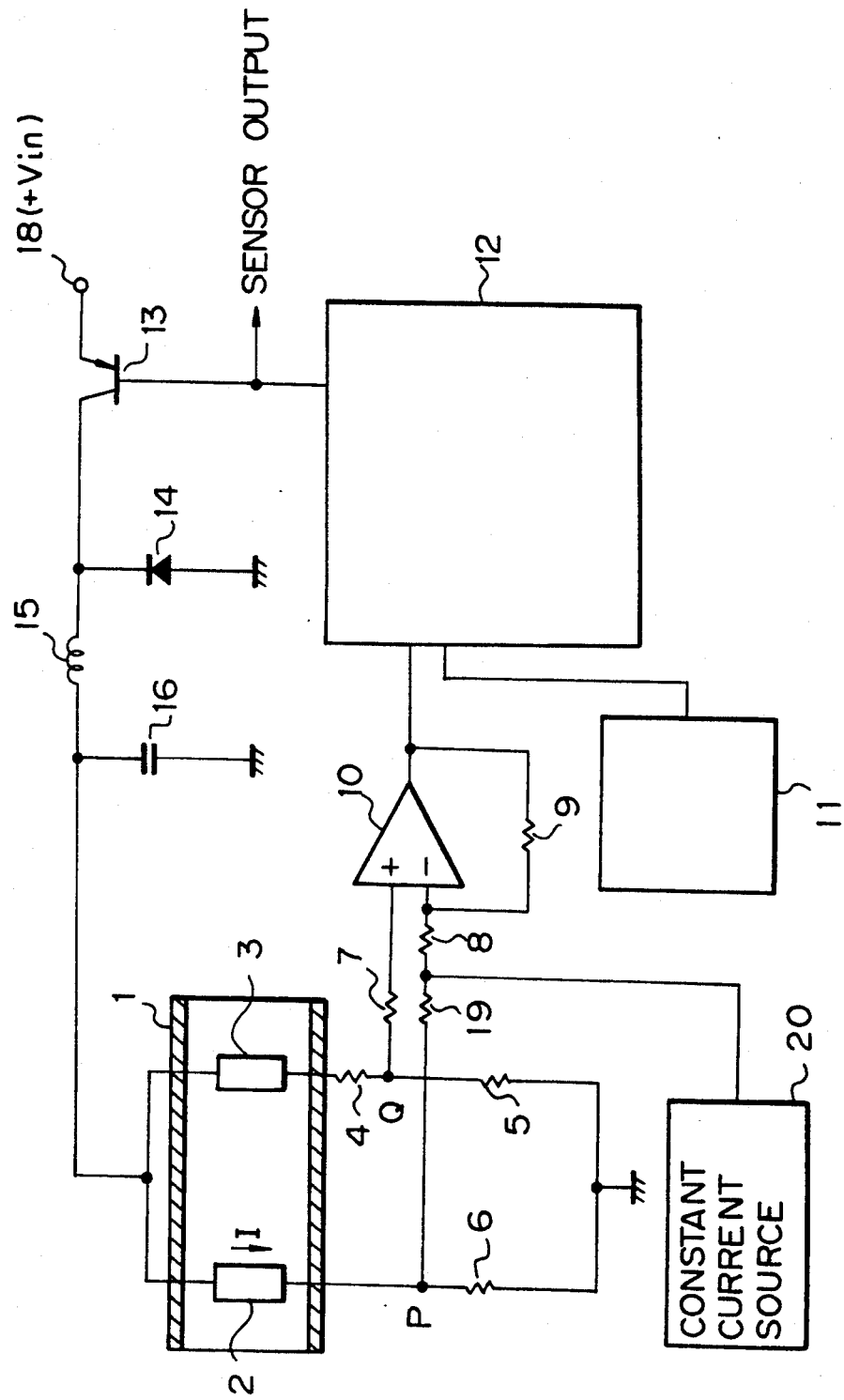
Figure 5:
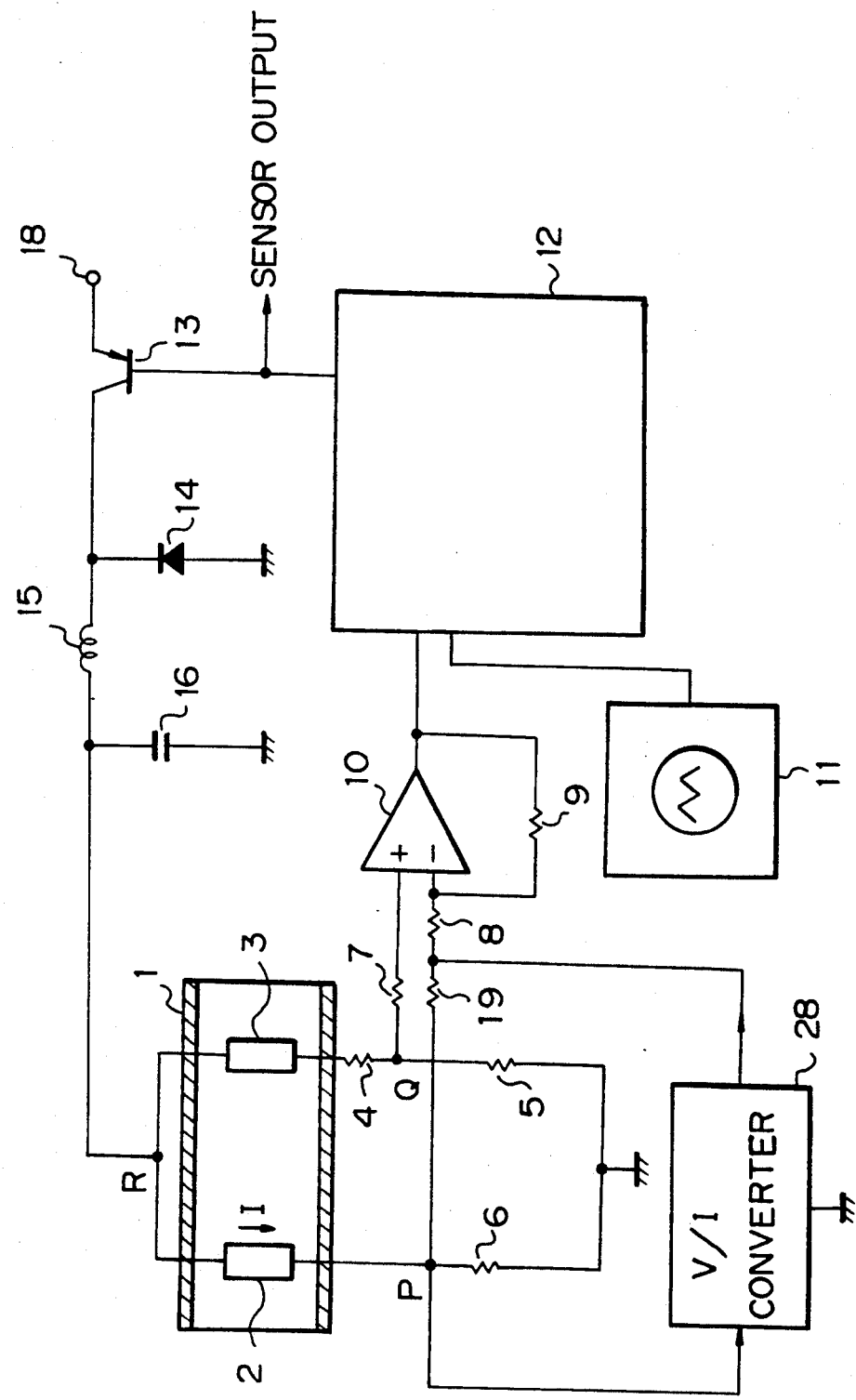

FIG. 5 illustrates a second embodiment of the present invention wherein numeral 28 designates a voltage to current (V/I) converter and numeral 19 denotes a fixed resistor. This embodiment does not include any constant DC unbalanced power source such as the power source 17 incorporated in the above-mentioned conventional sensor shown in FIG. 2 or such as the constant current source shown in FIG. 3. Other elements in FIG. 5 are similar to those of the conventional sensor.

The V/I converter 28 is adapted to output a current proportional to the voltage at the point P, or caused between both the ends of the resistor 6, and to supply the current to the resistors 8 and 19 which are connected in series between the point P and the negative input terminal of the amplifier 10. The values of the resistors 6 and 19 are set to be sufficiently smaller than those of the resistors 8 and 9. The current value output from the V/I converter 28 is set to be sufficiently smaller than the heating current flowing through the temperature sensing element 2 and the resistor 6, and sufficiently larger than the current flowing through the resistors 8 and 9. Accordingly, almost all the current from the V/I converter 28 may flow to the earth through the resistors 19 and 6, therefore the DC gain A of the differential amplification circuit is determined by only the resistance values of the resistors 8 and 9 while an unbalanced DC voltage is variably determined by the output current from the V/I converter 28 and the resistance value of the resistor 19. With regard to detection of the flow rate, a constant temperature control and the influence of the DC unbalanced voltage over the frequency response are basically equivalent to those of the prior sensor shown in FIG. 2 or 3.

Figure 8A:
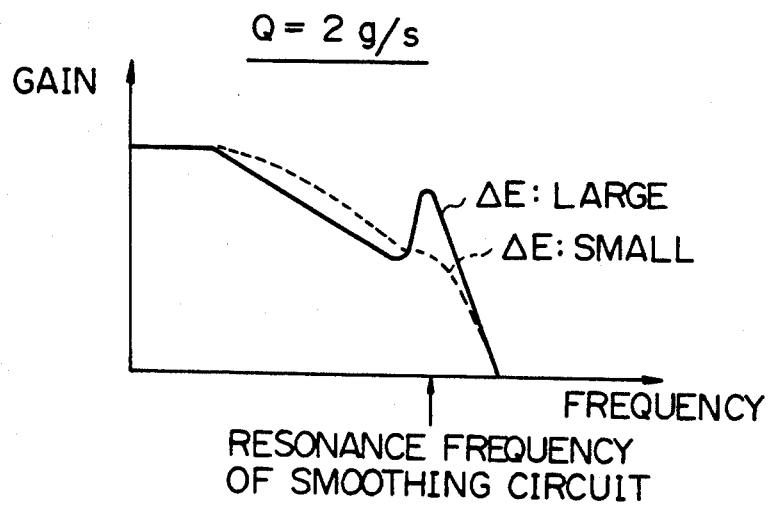
FIG. 8(a) is a diagram representing frequency resonance characteristics of flow sensors as shown in FIGS. 3 and 5 in the case of Q=2 g/sec.
Figure 8B:
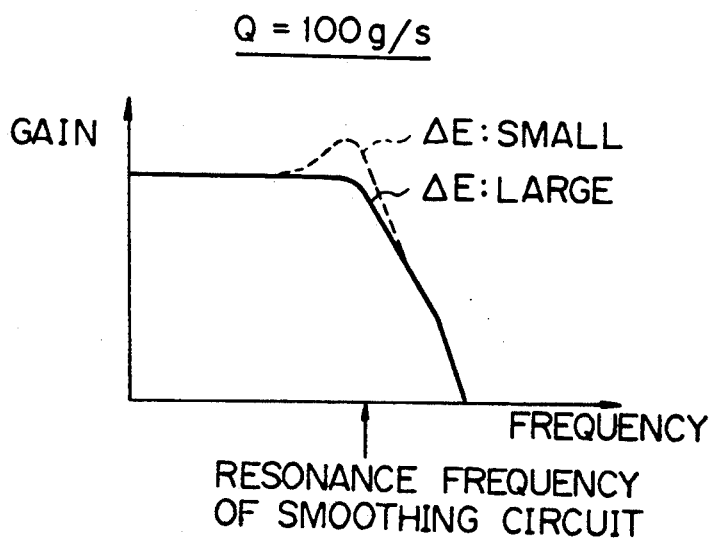
FIG. 8(b) is a diagram similar to that shown in FIG. 8(a), however in the case of Q=100 g/sec.

As a result, since the unbalanced DC voltage is proportional to the heating current flowing through the temperature sensing element 2, the unbalanced voltage is low in the range of a low flow rate and it becomes higher as the flow rate increases. Accordingly, an optimum frequency response may be obtained in the full range of flow rate as shown in FIG. 8(a) (ΔE: small) and FIG. 8(b) (ΔE: large).

It is further to be noted that according to the second embodiment shown in FIG. 5, although the voltage between the opposite ends of the resistor 6 has been selected as the input voltage to the V/I converter 28, similar effect may be omitted if the voltage at the connection point R between the temperature sensing elements 2 and 3 for example is selected, which exhibits monotonous increasing characteristics depending on the flow rate.

Figure 9:
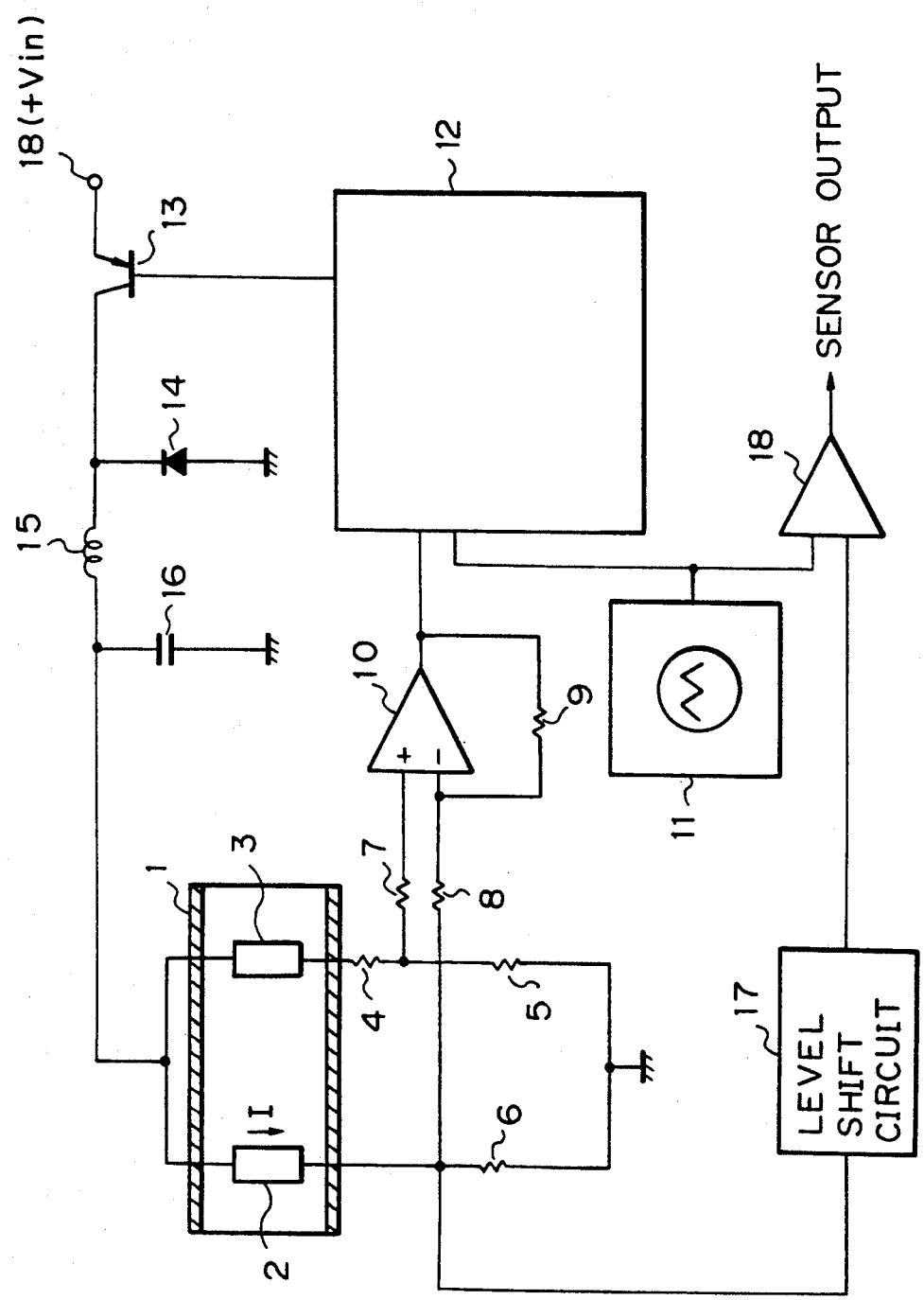
FIG. 9 illustrates a circuit diagram of a third embodiment of this invention.

FIG. 9 shows a third embodiment wherein a level shift circuit 17 is provided so as to shift the voltage between the opposite ends of the fixed resistor 6 to the level of zero when the flow rate is zero. The shifted voltage output is coupled to an input terminal of a comparator 18, the other input terminal of which is connected to the output terminal of the triangular wave generator 11. The output $V_s$ of the level shift circuit 17 can be obtained from equation (3) as follows:

$$V_s = R_6 \cdot \sqrt{A + B\sqrt{Q}} - V_f \qquad (6)$$

where $V_f$ is the shift voltage. Supposing that the minimum value of the triangular wave voltage from the triangular wave generator 11 is $V_l$, the maximum value thereof is $V_h$, one cycle of the output signal from the comparator 18, or the generator 11 is T, and the "high" time thereof is $T_h$, then the time ratio $D_s$ of the output signal of the comparator 18 will be calculated as, $$D_s = \frac{T_h}{T} = \frac{V_s - V_l}{V_h \cdot V_l} \qquad (7)$$

The output of the triangular wave generator 11 is adapted so as not to depend on the source voltage ($+V_{in}$). Also as can be seen from the equation (6), the output $V_s$ of the level shift circuit 17 and the voltage at the point P relate to the intake air flow rate Q but not the source voltage ($+V_{in}$). Accordingly, the time ratio $D_s$ of the digital output from the comparator 18 is a function of the flow rate only, as shown in the equation (7) and does not depend on the source voltage. It is therefore possible to calculate the flow rate Q in the intake air tube 1 by measuring the time ratio $D_s$ of the digital output of the comparator 18.

It is also to be noted that the first and second embodiments shown in FIGS. 4 and 5 may output a sensor output from the base of the transistor through an inverter instead of the collector of the transistor 122.

As explained above, according to the first embodiment, the frequency characteristic of a sensor which has been resonant may be of an attenuating type caused by lowering the AC gain of the differential amplification circuit when the measurable range of flow rate has been expanded. Furthermore, it has become possible for the DC gain to be increased rather than as in the conventional art, realizing an ideal constant temperature circuit and enhancing the accuracy of measurement.

According to the second embodiment, since the unbalanced DC voltage which exerts an influence over the frequency response of a sensor has been made variable depending on the flow rate, an optimum frequency response characteristics could be attained in the full range of flow rate and also the measurable range of flow rate has been expanded.

According to the third embodiment, since the flow rate output is obtained by converting the analog voltage corresponding to the heating current into the digital signal, rather than in the form of the output signal from the controlled pulse generating circuit depending on the source voltage, it is possible to attain a highly accurate measurement of flow rate without the result being influenced by the change in the source voltage. Accordingly, it is not necessary to detect the source voltage and compensate it if any variation exists as in the case of a prior art sensor. Since the addition of a simple circuit makes it possible to attain a precise measurement, the relative cost may be reduced contrary to that in the case of using an analog-digital converter.

It is further understood by those skilled in the art that the foregoing description are preferred embodiments of the invention and that various changes and modifications may be made in the invention without departing from the spirit and scope thereof.

What is claimed is:

1. A thermal flow sensor of a switching control type for measuring the flow rate of intake air comprising:

a bridge circuit including temperature sensing resistors disposed in the path of intake air and fixed resistors;

differential amplification means for amplifying the output of said bridge circuit;

pulse generating means coupled to said differential amplification means and for generating a pulse train having a time ratio corresponding to the output level of the amplification means;

power supply control means having a switching means which is controlled to turn on and off by said pulse train from said pulse generating means and a smoothing circuit which makes the output from said switching means continuous, whereby the level of a DC power supply for said bridge circuit is controlled in accordance with said time ratio of said pulse train; and means for preventing resonance phenomenon on a loop circuit comprising said bridge circuit, differential amplification means, pulse generating means and power supply control means, in the full range of said flow rate.

2. A thermal flow sensor according to claim 1, wherein said differential amplification means comprise a differential amplifier with resistors for determining an amplification gain thereof and a DC unbalanced supply source connected between a first output terminal of said bridge circuit and a first input terminal of said differential amplifier through one of said gain determination resistors.

3. A thermal flow sensor according to claim 2, wherein said preventing means comprise a phase lag compensation circuit connected between said first input terminal of said differential amplifier and the output terminal thereof.

4. A thermal flow sensor according to claim 3, wherein said phase lag compensation means comprise a resistor and a capacitor connected in series.

5. A thermal flow sensor according to claim 1, wherein said preventing means comprise a variable DC unbalanced voltage generator which is connected between a first output of said bridge circuit and a first input terminal of said differential amplification means and generates a variable DC unbalanced voltage which increases as said flow rate of said intake air increases.

6. A thermal flow sensor according to claim 5, wherein said voltage generator comprises a voltage/current (V/I) converter which receives the voltage output from said first output terminal of said bridge circuit and outputs the current in accordance with the received voltage, and a resistor connected between said first output terminal of said bridge circuit and the current output terminal of said V/I converter so as to flow the current from said V/I converter to said first output terminal, whereby said variable DC unbalanced voltage generates across said resistor.

7. A thermal flow sensor according to claim 1, 2, 3, 4, 5 or 6, wherein said pulse generating means comprise a triangular wave generator and a comparator which compares the triangular wave from said generator with said output from said amplification means.

* * * * *